United States Patent
Chica Barrera et al.

(10) Patent No.: US 11,587,455 B2
(45) Date of Patent: Feb. 21, 2023

(54) ADVANCED DEVICE FOR WELDING TRAINING, BASED ON AUGMENTED REALITY SIMULATION, WHICH CAN BE UPDATED REMOTELY

(71) Applicant: SEABERY NORTH AMERICA, INC., Annapolis, MD (US)

(72) Inventors: Juan Jose Chica Barrera, Huelva (ES); Francisco Jose Aguilar Nieto, Huelva (ES); Basilio Marquinez Garcia, Huelva (ES); Alejandro Villaran Vazquez, Huelva (ES)

(73) Assignee: Seabery North America, Inc., Annapolis, MD (US)

( * ) Notice: Subject to any disclaimer, the term of this patent is extended or adjusted under 35 U.S.C. 154(b) by 0 days.

(21) Appl. No.: 17/384,984

(22) Filed: Jul. 26, 2021

(65) Prior Publication Data
US 2022/0013032 A1 Jan. 13, 2022

Related U.S. Application Data

(63) Continuation of application No. 16/666,018, filed on Oct. 28, 2019, now abandoned, which is a
(Continued)

(30) Foreign Application Priority Data

Jun. 13, 2012 (ES) .............................. ES201230924

(51) Int. Cl.
*G09B 19/00* (2006.01)
*G09B 19/24* (2006.01)
(Continued)

(52) U.S. Cl.
CPC ............. *G09B 9/00* (2013.01); *G09B 19/003* (2013.01); *G09B 19/24* (2013.01); *B23K 9/09* (2013.01); *B23K 9/095* (2013.01); *B23K 9/0953* (2013.01)

(58) Field of Classification Search
CPC .......... G09B 19/24; B23K 9/09; B23K 9/095; B23K 9/0953
See application file for complete search history.

(56) References Cited

U.S. PATENT DOCUMENTS 6,330,598 B1 * 12/2001 Beckwith ............. H04Q 3/0029
709/224
7,215,322 B2   5/2007 Genc
(Continued)

FOREIGN PATENT DOCUMENTS

ES   1057916 U   10/2004
ES   2274736 A1   5/2007
(Continued)

OTHER PUBLICATIONS

B. Hillers, "TEREBES: Welding Helmet with AR Capabilities", Paper, 2004, 1-10.
(Continued)

*Primary Examiner* — Robert J Utama
(74) *Attorney, Agent, or Firm* — Hayes Soloway PC

(57) ABSTRACT

Advanced device for the welding training based on simulation with Augmented reality and with remote updates that allows the simulation of: all the industrial welding types—s electrode stick (SMAW), MIG/MAG (GMAW, FCAW) and TIG (GTAW)—; all the materials; all the joint types and, also all the welding positions (1Fa 4F, 1G a 6G, 6GR, etc.). It offers an accurate simulation of a real welding equipment thanks to the use of the Augmented Reality technology, which allows the interaction between different elements in several layers. All this is implemented by a monitoring and
(Continued)

student evaluating system that allows the teacher to control remotely what is happening in the classroom in real time and without the necessity of being physically present in the training.

18 Claims, 21 Drawing Sheets

Related U.S. Application Data continuation of application No. 14/406,228, filed as application No. PCT/ES2013/070315 on May 17, 2013, now Pat. No. 10,460,621.

(51) Int. Cl.
*G09B 9/00* (2006.01)
*B23K 9/095* (2006.01)
*B23K 9/09* (2006.01)

(56) References Cited

U.S. PATENT DOCUMENTS

| | | | |
|---|---|---|---|
| 8,569,655 B2 | 10/2013 | Cole | |
| 8,749,396 B2 | 6/2014 | Maggiore | |
| 8,992,226 B1 | 3/2015 | Leach | |
| 9,368,045 B2 | 6/2016 | Becker | |
| 9,511,433 B2 | 12/2016 | Inukai | |
| 9,511,443 B2 | 12/2016 | Pfeifer | |
| 9,589,481 B2 | 3/2017 | Becker | |
| 10,032,388 B2 | 7/2018 | Sommers | |
| 10,406,621 B2* | 9/2019 | Salsich | B23K 9/095 |
| 2004/0113885 A1 | 6/2004 | Genc et al. | |
| 2007/0188606 A1 | 8/2007 | Atkinson et al. | |
| 2007/0273610 A1 | 11/2007 | Baillot et al. | |
| 2008/0038702 A1 | 2/2008 | Choquet et al. | |
| 2009/0298024 A1* | 12/2009 | Batzler | G09B 5/00 434/234 |
| 2010/0062406 A1 | 3/2010 | Zboray et al. | |
| 2011/0006047 A1 | 1/2011 | Penrod et al. | |
| 2011/0091846 A1 | 4/2011 | Kreindl et al. | |
| 2011/0117527 A1 | 5/2011 | Conrardy et al. | |
| 2011/0183304 A1 | 7/2011 | Wallace et al. | |
| 2012/0122062 A1 | 5/2012 | Yang et al. | |
| 2012/0189993 A1 | 7/2012 | Kindig et al. | |
| 2013/0040270 A1 | 2/2013 | Albrecht et al. | |
| 2013/0189658 A1* | 7/2013 | Peters | G06F 30/20 434/234 |
| 2014/0263224 A1* | 9/2014 | Becker | G09B 19/24 219/124.5 |
| 2014/0336795 A1* | 11/2014 | Asenjo | G05B 19/4083 700/86 |
| 2015/0235423 A1 | 8/2015 | Tobita et al. | |
| 2017/0046977 A1 | 2/2017 | Becker et al. | |

FOREIGN PATENT DOCUMENTS

| | | |
|---|---|---|
| KR | 20100118943 A | 11/2010 |
| WO | 2009146359 A1 | 12/2009 |
| WO | 2010020870 A2 | 2/2010 |
| WO | 2011067447 A1 | 6/2011 |

OTHER PUBLICATIONS

Anonymous, "Fiducial Marker", Wikipedia: The Free Encyclopedia, Retrieved from Internet on Oct. 1, 2021, URL: <https://en.wikipedia.org/wiki/Fiducial_marker>.

Anonymous, "Augmented Reality", Wikipedia: The Free Encyclopedia, Retrieved from Internet on Oct. 1, 2021, URL: <https://en.wikipedia.org/wiki/Augmented_reality>.

Anonymous: "Soldamatic Educational, la tecnologfa educativa mas avanzada y competitiva del mundo para la formaci6n de soldadores 100% espafiola", Feb. 15, 2012 (Feb. 15, 2012), XP055216349, Retrieved from the Internet: URL: http://www.iberdidac.org/news/seabery/seabery15022012.html [retrieved on Sep. 25, 2015].

Soldamatic 2012 Augmented Reality Training.wmv11, May 22, 2012 (May 22, 2012), XP054976097, Retrieved from the Internet: URL:https://www.voutube.com/watch?v=EXcytWjEShO [retrieved on Sep. 28, 2015].

* cited by examiner

Figure 8:
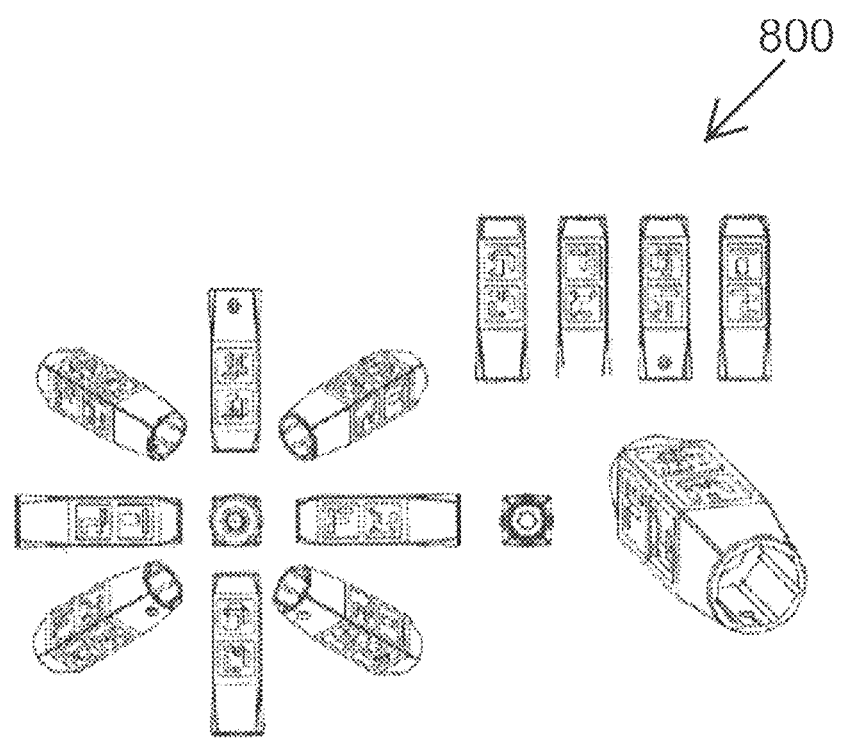

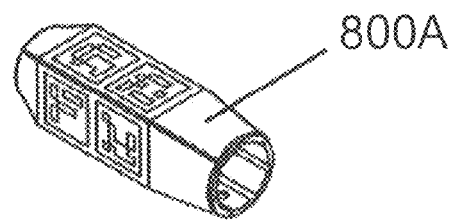
Fig. 8.A
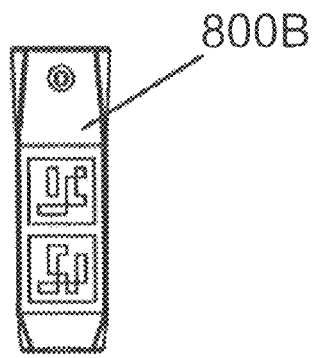
Fig. 8.B
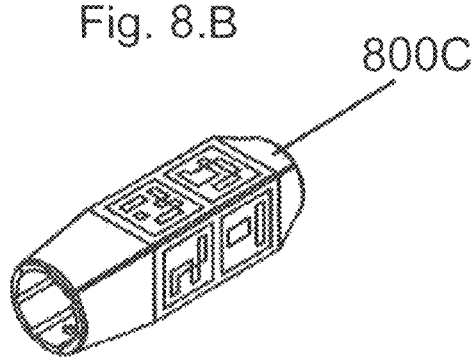
Fig. 8.C

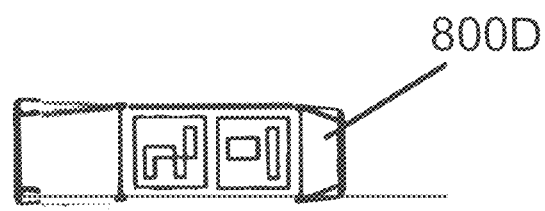
Fig. 8.D
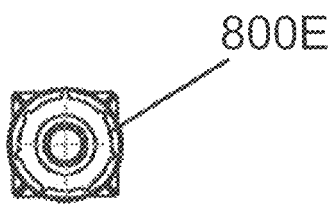
Fig. 8.E
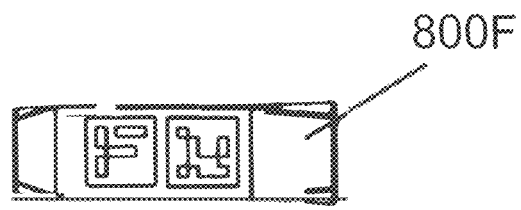
Fig. 8.F

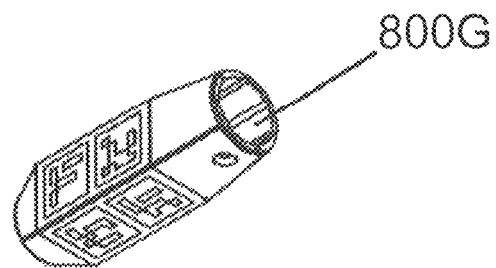
Fig. 8.G
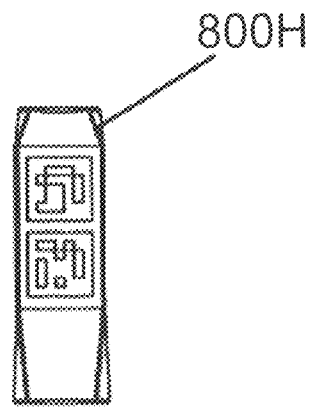
Fig. 8.H
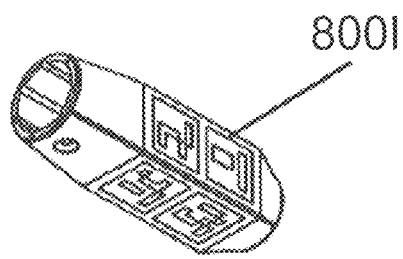
Fig. 8.I

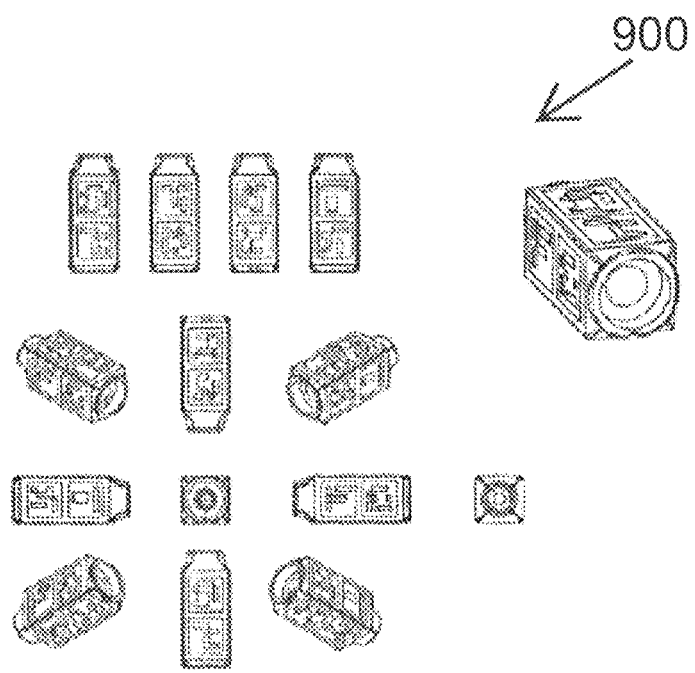
Fig. 9
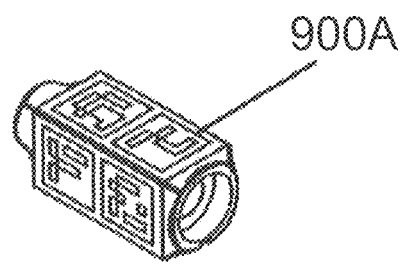
Fig. 9.A

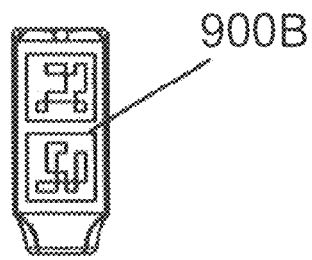
Fig. 9.B
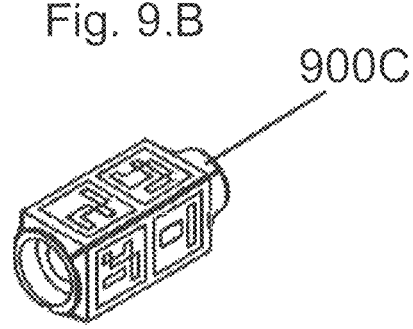
Fig. 9.C
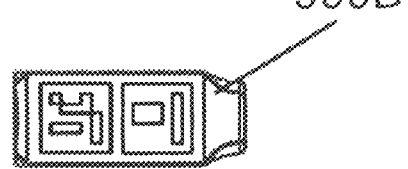
Fig. 9.D
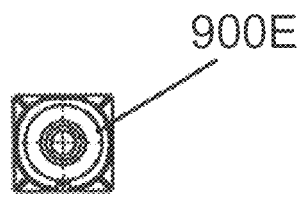
Fig. 9.E

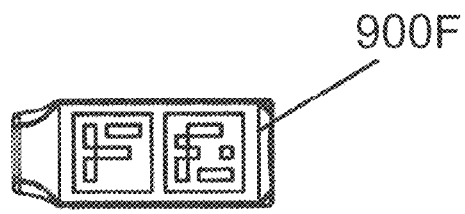
Fig. 9.F
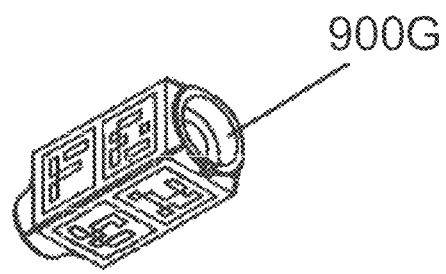
Fig. 9.G
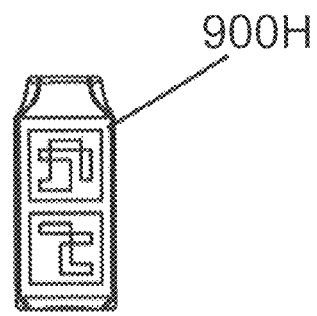
Fig. 9.H
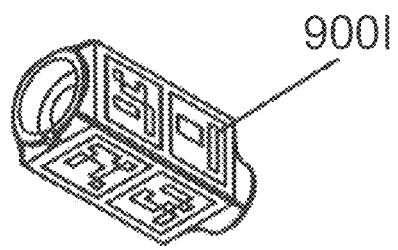
Fig. 9.I

ADVANCED DEVICE FOR WELDING TRAINING, BASED ON AUGMENTED REALITY SIMULATION, WHICH CAN BE UPDATED REMOTELY

CROSS-REFERENCE RELATED APPLICATIONS

This application is a continuation of U.S. patent application Ser. No. 16/666,018, filed Oct. 28, 2019, titled "Advanced Device for Welding Training, Based on Augmented Reality Simulation, Which Can be Updated Remotely", which is a continuation of U.S. patent application Ser. No. 14/406,228, having a 371(c) date of Dec. 8, 2014 (now U.S. Pat. No. 10,460,621, issued Oct. 29, 2019), titled "Advanced Device for Welding Training, Based on Augmented Reality Simulation, Which Can be Updated Remotely", which is a National Stage entry of PCT/ES2013/070315, filed May 17, 2013, titled "Advanced Device for Welding Training, Based on Augmented Reality Simulation, Which Can be Updated Remotely", which claims priority to Spanish patent application no. P201230924 filed Jun. 13, 2012, each of which is hereby incorporated herein by reference.

DESCRIPTION

Advanced device for the welding training based on simulation with Augmented Reality and with remote updates.
Subject Matter of the Invention According to the title of the present descriptive memory, this invention is an 'Advanced device for the welding training based on simulation with Augmented Reality and with remote updates', which provides an effective and efficient tool for the welding training in all branches and industrial processes.

This invention has been conceived for its application in the welding training field.

For that reason, the training contents belong to the Intermediate and Advanced educational cycles, to the non-formal education, to the university education or, even, to the training in the Work Centers and the training based on the International Guidelines established by the European Welding Federation (EWF) and the American Welding Society (AWS).
Welding Background Welding is a very complex process that is present in most of everyday objects: vehicles, buildings, electrical appliances, furniture, infrastructures. For that reason, a welding process must be carried out by a qualified personnel that guarantees our safety. This can be achieved by an appropriate training based on the most demanding guidelines.

Nowadays, there is a strong demand for the welding training to have access to the great variety of jobs that this sector provides. The current training methods require an important cost in: infrastructures (facilities with the appropriate height, gases extraction system and oversized electrical installations); materials (work pieces that need to be previously prepared); 9consumables (gases, electrodes sticks, filler rods); and repair of the machinery and replacement of the broken or damaged work pieces, something that is usual for a student that works for the very first time with a welding equipment, and, even, for welders that are going to learn a new welding process.

Moreover, there is an important emission of harmful gases that contributes to the global warning, although there are expensive gases extraction systems in the facilities. For that reason, it would be necessary to reduce the workshop time without affecting to the training quality.

As if that were not bad enough, all the students are exposed to physical risks during the learning process, (burns, electric shocks, shrapnel injuries), especially at the beginning of it because they are not familiarized with the welding equipment and its functioning.

For all the previous reasons, it can be said that the current methodologies has clear limitations in the welding training, so it would be necessary to invest in new resources that avoid those limitations without reducing the quality of the education.

This invention consists on the design and development of a new advanced device that is not currently present in the worldwide market for technologies. The new device will include the simulation of all the types of industrial welding with different materials and alloys; all the work pieces types and all the welding positions. It is very useful for the welders recruitment processes carried out by companies; for the substitution of an important percent of the time of the workshop practices; and for the accreditation and certification processes in basis of the international guidelines EWF and AWS.

Some of the desired objectives of this invention are: the possibility of having a system of simulation and training oriented to an advance education more efficient, sustainable, versatile, intuitive and easier to use; to motivate the students in the learning process; and to facilitate the teacher's labor in the classroom and in the assessment of the different exercises.

The present invention provides a very important knowledge about advanced systems of simulation designed for the training in order to facilitate the learning process of future welders. All this will promote the progress and productivity of the welding activity and also the training systems.

The purpose of this invention is to introduce important innovations in the current devices that are used for the welding simulation. In short, the purpose of this invention is to design and develop a new device, a technological leap to take the maximum advantages of the new technologies to use them for the benefit of the students, the teacher and the training centers. This drives the progress and the productivity of the business process of the welding training, in this case.

As it has been said before, nowadays there is a strong demand for the welding training to have access to jobs that required a qualification in different sectors of the economic activity.

The current welding training requires important costs in materials (work pieces), consumables (gases, electrode sticks), repairs of machinery and replacement of damaged work pieces.

In the line with the previous idea, there is also an important cost in time because a course has a number of hours that the students use to familiarize with the welding equipment and all its elements.

The current training systems have a great number of limitations and, for that reason, the simulation techniques are being used as a support tool in the welders' learning process.

Those limitations involve an important time cost because many workshop hours are used by the students to get used to the welding equipment, so there are not many effective hours during the learning and the training process. For that reason and due to the great number of limitations and disadvantages that the current training systems have, the simulation technique has been introduced as a support tool for the welders' learning process.

Although there are welding simulators in the current market, they have several limitations as the following ones:
1. They are single devices, so they can be used only by one student and there is not interaction between the student and the teacher. In the case of the latter, he must focus on one student, if he wants to evaluate his skills and, this means that he has to disregard the rest of the trainers.
2. To use these devices, it is necessary to have a previous knowledge because they are not intuitive. This is an added difficulty for the students.
3. They do not look like real welding equipment and they do not incorporate real connectors, torches or welding masks, neither, so the students cannot be familiarized with the use of real welding.
4. Most of these devices, do not assess the students' learning level and do not monitor the history of a specific student that can be stored and consulted by the teacher when considered necessary.
5. These devices do not work with all the types of welding joints and all the welding positions, so the student training is totally limited.
6. All the industrial welding processes cannot be performed by these devices and cannot be adapted to the welding materials of specific sectors like mining or aviation, among others.
7. Some of these devices do not allow the students regulating welding parameters and do not support the welding visual and sound effects. Moreover, they do not represent welding bead with real appearance and the welding defects, so the students cannot visualize them and understand why they occur.
8. Their initial configuration cannot be extended, so they cannot develop the advances that may be produced in the multimedia field and in the 30 animation.
9. These devices have followed an industrial approach, so their only purpose is to imitate a welding simulator without taking into account the didactic approach that is necessary to be present in a pedagogic tool whose objective is to offer a better training.
10. They do not work with the last and most advanced technologies, but with virtual reality, so they might become outdated in short period. At their best, the current simulators incorporate virtual reality through which a virtual working environment (not real) is generated. In that case, the reference of the working environment is totally lost, so the student will not experience what happens in a real workshop and that in important limitation in the training process: the student visualizes a digital workshop while he is in a room that is completely different. The same happens with the work pieces (in the best cases they are represented by physical work pieces that do not have the same characteristics and dimensions as the real ones) and the welding torches.

The virtual reality is almost the limit of the communication technologies because it wants the user to be immersed in a 'reality' (a world created by a computer) that does not exist.

This technology has been greatly exceeded by the Augmented Reality (present in this invention), that is a combination of real elements with virtual images. The user can work and examine 30 objects while he is receiving additional information (texts, graphics, etc.) about those objects and the task he is working on. For that reason, the Augmented Reality allows the user being always in contact with his working environment, so the role of the computer is just to 'augment' the reality to improve the pedagogic experience.

The main difference between the Virtual Reality and the Augmented Reality lies in the way in which they use the real world. As it has been said before, the Virtual Reality wants the user to be immersed in a virtual world which does not represent the real one, while the Augmented Reality allows the student visualizing the real world and 'augment' the vision of his environment through the superposition or composition of the virtual 3D objects. Definitely, the Augmented Reality gives the impression that, both the real and the virtual world, coexist in a same environment.

In short, it can be said that the Augmented Reality brings the computer to the real working environment while the Virtual Reality systems try to bring the real world into the computer.

Development of the Simulation in the Training Processes

When addressing the training curriculum of a student, it is necessary to take into account the didactic tools that are going to be used to complete the different stages of the training. One of those tools is the simulation that allows addressing any dynamic system in which all the variants and parameters can be distinguished.

Nowadays, the implementation of the simulation techniques in the current education systems is a reality. The necessity of understanding particular mechanisms, technical operators and systems, has led to the use of the computer as a learning tool and the current multimedia environments and the powerful graphical programming tools are very useful for the teachers.

Regarding the development of the simulation environments and tools, either at a general level or in the welding field, it can be said that it has provided important changes and advances in the way of using the several tools that have appeared over the years.

The following classification groups the three big periods or generations of the simulators:
Simulators of the $1^{st}$ Generation
a. CAI Applications.
b. Applications in Basic, Pascal and Logo characterized in:
  Applications with low graphical possibilities.
  Low interactivity with the student.
  Rigid simulation scenarios.
  There is not stimulation for creativity.
Simulators of the $2^{nd}$ Generation
a. Multimedia applications in Windows Neobook, Toolbook, Director and Macromedia.
b. There are specific applications for the simulation characterized by:
  Incorporating graphic elements and a great variety of objects (buttons, sliders, meters, tracers).
  Allowing the incorporation of Scripts and Macros.
  Self-assessment activities.
  The possibility of designing different itineraries in basis of the student's learning process.
Simulators to the $3^{rd}$ Generation:
a. Graphic environment and language: C++, Visual Basic, Delphi, Java.
b. Simulation tools that constitute environments according to the following characteristics:
  Environments that have connection to the outside.
  Full management of multimedia resources.
  E-learning applications.
  Learning techniques and intelligent tutorial actions.
  Communication protocol TCP/IP.
  Programming techniques that are oriented to objects.

Incorporation of the OLE and ActiveX techniques.

As it can be observed, all the simulation tools have been developed positively through time because they have been incorporating new technologies and functionalities that have turned them into more robust, versatile and practical devices.

The traditional education approaches have been affected by the information and communication technologies, so the educational world is also introducing those advances to make it more efficient.

Augmented Reality Concept

Within the latest technologies generation we can find the Augmented Reality, that is used to define a direct or indirect vision of a physical environment of the real world whose elements are combined with virtual elements to create a mixed reality in real time that improve, in this case, the user's training and pedagogic experience. This new technology complements the perception and interaction with the real world and allows the user being in an 'augmented' real world with additional information that is generated by a computer. For all the previous reasons, the Augmented Reality offers unlimited opportunities of interaction in many fields as: architecture, entertainment, art, medicine or virtual communities.

However, the knowledge and applicability of the Augmented Reality technology in the training field are minimal due to its state of development and its unusual presence in the everyday areas of society. The investigation, development and spreading of the use of this technology in the education area, will, therefore, contribute to its extension in the teaching community.

In light of the above circumstances, nowadays there are several systems that are focused on the teaching area in the welding field, as the simulators. Nevertheless, those simulators already have several limitations, so more investigation is totally necessary to carry out new technological developments in this area.

Review of Products in the Market

According to the state of the simulation in the current market, the Spanish company 'Apolo Studios' proposes its product "WeldTrainer", which has the following limitations comparing it with the present invention:

Mid graphics level.
Virtual reality technology.
Real welding connectors and torches are not used.
It does not use real welding positions.
There is not TIG (GTAW) simulation.
It does not support tube welding (only in a figurative way).
It does not have neither Teacher Software nor work stand.
It is bulky and heavy.
It is more expensive.

The French Company 'Diginext' proposes its product "CS-Wave", which has the following limitations comparing it with the present invention:

Mid-high graphics level.
Virtual reality technology,
Real welding connectors and torches are not used.
It does not support tube welding (only in a figurative way).
It does not have neither Teacher Software nor work stand.
It is bulky and heavy.
It is more expensive.

The Austrian Company 'Fronius' markets its product "Virtual Welding", which have the following limitations comparing it with the present invention:

It does not reproduce welding effects: smoke, splatters, etc.
It does not reproduce the welding bead defects.
Virtual reality technology.
Real welding connectors and torches are not used.
It does not use real welding positions.
There is no simulation in: SMAW and TIG (GTAW) with filler rod.
It does not have neither Teacher Software nor work stand.
It is bulky and heavy.

Finally, Lincoln Electric (E.E.U.U) offers the most advanced product that is "VRTEX 360", but it also has limitations when comparing it with the present invention:

Virtual reality technology.
Real welding connectors and torches are not used.
It does not support tube welding (only in a figurative way).
It does not have neither Teacher Software nor work stand.
It is bulky and heavy.
It is substantially more expensive.

As a mode of conclusion, the proposed system will generate, in a virtual way, only the result of the user's action during the welding execution, as well as the welding effects like the melting bath, splatters, smoke. The student will work with a real work pieces that have real dimensions (in basis of the international guidelines of the European Welding Federation and the American Welding Society) to let him be familiarized with the real welding positions as he was welding with a real equipment, interacting with his environments, the rest of students and the teacher. The obtained sensations are more real, so the learning process is more efficient and useful. This is one of the main innovations that are incorporated in the new device, which brings a revolution to the current training processes because the use of real torches and connectors let the user execute the same actions as if he were working with real equipment and work pieces. As a final conclusion, this new device will improve the current learning processes significantly.

For all the previous reasons, the presents invention wants to improve the welding training as the user will be able to use real elements in the whole welding process (torches, connectors, welding equipment), in a real welding scenario (type of work piece, thickness, position, material type, joint type) and with the possibility of introducing all the necessary parameters that a welding equipment needs (intensity, voltage, protecting gas, wire/electrode/filler rod diameter, polarity), obtaining, therefore, a real result. Besides, the teacher could organize the different courses and students in a very simple way, as well as designing the welding exercises to assign them to the users in basis of their level. The teacher will be able to monitor the exercises in real time and without the necessity of being physically present in the classroom. This is possible thanks to the Teacher Software that is also a part of the simulator device.

Explanation of the Invention

By way of explanation of the "Advanced device for the welding training based on simulation with Augmented Reality and remote updates", it an educational technology that allows the simulation of all the industrial welding types—SMAW, MIG/MAG (GMAW, FCAW), and TIG (GTAW); all the materials, all the welding joints and all the welding positions (1F to 4F, 1G to 6G, 6GR), through the Augmented Reality, which has been developed by the applicant. This device provides the possibility of interacting with the different elements in several layers and it is implemented by a control system to monitor and assess the students without the necessity of being physically present in the training center. The goal of this invention is to reduce the workshop time and the costs those practices involve. Moreover, it pretends to provide a more attractive, motivating, safe and sustainable training that can be adapted to the necessities of the client. The applications of this educational technology are: the initial and advanced training, a help in the welders recruitment and a support in the certification and accreditation processes in basis of the main standard guidelines. The device is characterized by the following elements:

1. A CPU (central processing unit) designed to reproduce the same appearance as real welding equipment. It is portable and includes: a LCD monitor for the visualization of the system menus, a navigation central button, a scape button, a real connector for the MIGMAG (GMAW,FCAW) and TIG (GTAW) welding torches, a real connector for the electrode clamp, a button to switch on the system and to start the Augmented Reality calibration, a connector for the electrode and for the TIG huma (GTAW) filler rod, a position selector to exchange between the wire speed and the voltage, 4 legs, 1 carry handle and 2 lateral supports to place the welding torches and the mask when they are not in use.

2. Real welding torches MIG/MAG (GMAW, FCAW), TIG (GTAW) adapted through the modification of their tip which has ARmarkers that make the torches recognizable in the three dimensional space thanks to the artificial vision of the Augmented Reality, which, in turn, allows their interaction with the rest of the elements.

3. A real electrode clamp that holds the simulated electrode and the simulated TIG (GTAW) filler rod and whose design is the same in appearance, touch and weight as the real electrodes and filler rods. They incorporate a micro electronic board and some optical fiber cords to obtain, at least, 3 light points in the surface of the simulated electrodes and filler rods. All this make both the electrodes and the filler rods interact with the rest of the elements.

4. Simulated work pieces designed with the same size, form and thickness as the real welding work pieces and made of plastic (PVC or similar). They represent the same joint types as the ones that are nowadays used in the base of the international standards. On the work piece surface, there are some green ARmarkers placed on a blue base, that make them recognizable in the three dimensional space and make them interact with the rest of the elements.

5. A detachable, portable and lightweight work stand for the work pieces that allows practicing all the welding positions: horizontal, vertical, fillet and overhead.

6. A welding mask with Augmented Reality that has been designed and manufactured as a commercial welding mask. It incorporates, through a fixing system, two micro cameras (to generate a stereo vision) that are placed at eye-level, oriented in their same direction and placed in a convergent form that generates a point of connection of the image that is, in turn, focused at a distance of 40 centimeters from the cameras to optimize the identification of the rest of the elements: work pieces, welding torches and electrodes/filler rods. It incorporates: a head-mount display that is perfectly adapted to the facial contour of the user and some 30 video glasses that show to the user the Augmented Reality when executing an exercise. Moreover, it incorporates, through an anchoring system, mini speakers that are place at the level of the users' ears allowing them to hear real welding sounds, so they are even nearer to reality. To facilitate the ergonomic use of all the cables that this mask includes, they are collected in a unique channeling that goes to the central panel of the CPU. This guarantees the robustness and the reliability of all the connections and reduces the risk of disconnections that can be caused by the continuous use in the welding courses. The mask is completed by the incorporation of an illumination system based on one or more LEDs (light emitting diode) and a light diffuser that facilitate the exercise execution.

7. An operating system based on a Linux version (open code) that has been optimized for the specific requirements of the system, so it is able to support high definition 30 graphics and the communications between student-simulators, simulators-teacher and server and between the virtual classroom (set of student-simulators, teacher-simulator and server) and the center for remote technical assistance.

8. A network architecture that is necessary to support, in a stable and safe way, the data Exchange between simulators—students, teacher-simulator, server and the center for remote technical assistance.

9. Implementation of mathematical algorithms that can simulate in 30 a real welding process with all the variants that it includes: proceeding level (parameters regulation, determination of the position, selection of the material, work piece, gas and filler rod), execution (melting, smoke, splatters, welding bead cooling, affected area by the heat), results and possible welding defects (gravity, welding pores, penetration excess, lack of melting).

10. Data matrices that make the simulator perform like a real welding equipment and make it offer the same results as real equipment would do in base of the selected parameters: voltage, intensity, gas type, material type, joint type, work piece type and position, welding procedures (SMAW, MIG/MAG (GMAW,FCAW) or TIG (GNAW)).

11. Technical and quality analysis of the executed welding bead through which the teacher could know the mistakes made in the exercise and could also obtain a comparative graphic that shows the level that students must reach to perform a good exercise.

12. A set of menus for the selection of the necessary welding parameters that helps the students to be even closer to the functioning of real welding equipment.

13. Human-machines interfaces with menus, connectors and buttons that have been designed to facilitate the teachers and the students' labor.

14. Remote assistance and updates through software without changing the simulator architecture and without the necessity of having new equipment. This tool allows the users to demand different characteristics depending on the sectors (automotive, shipping industry, mining) like: new welding procedures, materials or specific alloys. Moreover, this system gives the possibility of technical remote assistance from any part of the word and in real time.

15. Software libraries that are necessary for the incorporation of the Augmented Reality. This way the student will visualize the real work environment in which he is working at all times without finding himself in a virtual reality that is totally out of the real world.

FIGURES DESCRIPTION

Figure 1:
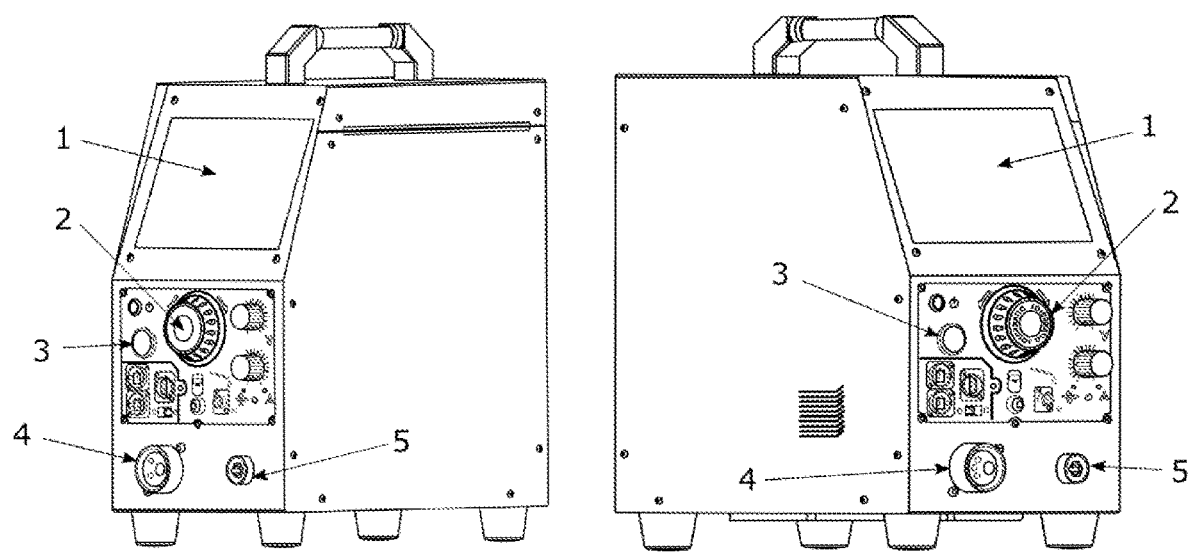

For a better understanding of the present description and to complement it, we have attached several figures for illustrative purposes but not limited:

FIG. 1.—Main perspectives of the "Advanced device for the welding training based on simulation with Augmented Reality and with remote updates" CPU. As shown in FIG. 1, the welding training device 100 includes an LCD monitor 1, a central navigation button 2, an escape/return/cancel button 3, a real connector for the MIG/MAG (GMAW) and TIG (GTAW) torches 4, and a real connector for an electrode clamp 5.

Figure 2:
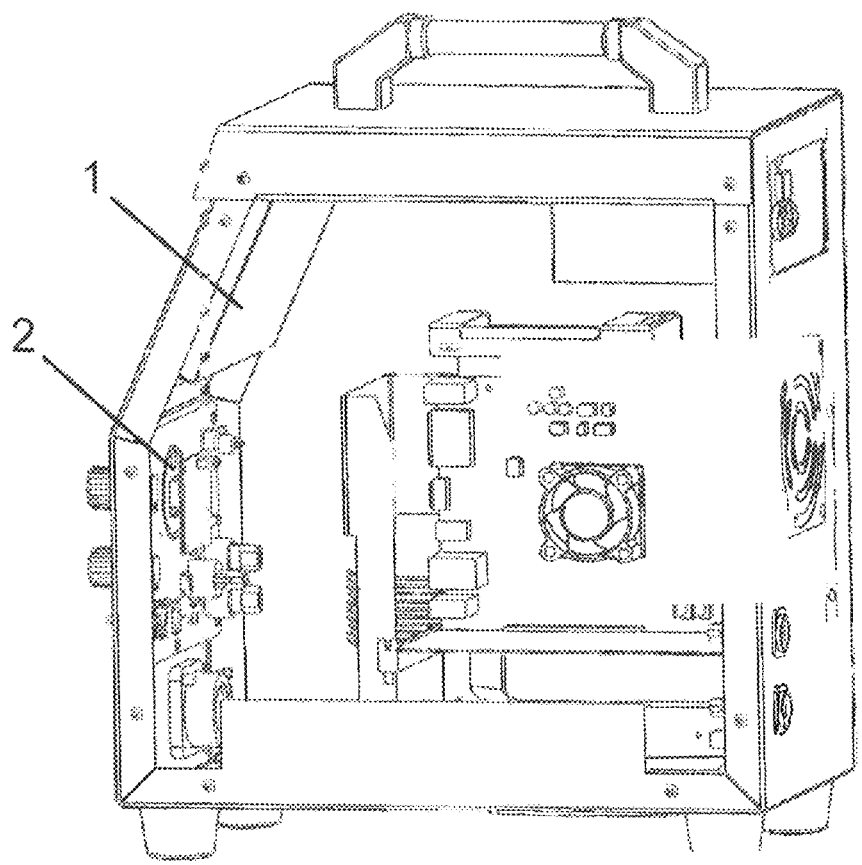

FIG. 2.—Interior of the "Advanced device for the welding training based on simulation with Augmented Reality and with remote updates" CPU. As shown in FIG. 2, the welding training device 100 includes an LCD monitor 1 and a central navigation button 2.

Figure 3:
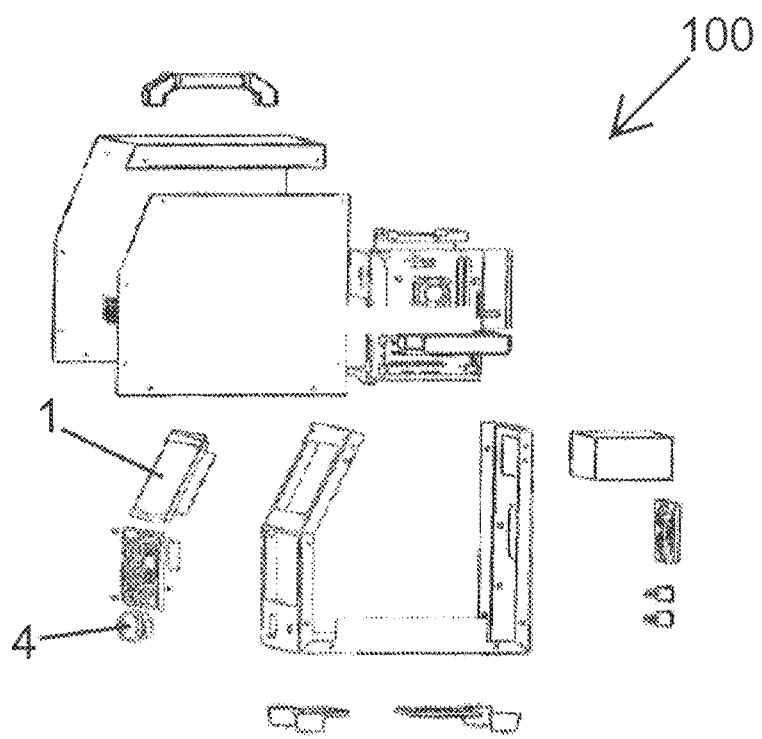

FIG. 3.—Internal spare parts of the "Advanced device for the welding training based on simulation with Augmented Reality and with remote updates" CPU. As shown in FIG. 3, the welding training device 100 includes an LCD monitor 1 and a real connector for the MIG/MAG (GMAW) and TIG (GTAW) torches 4.

Figure 4:
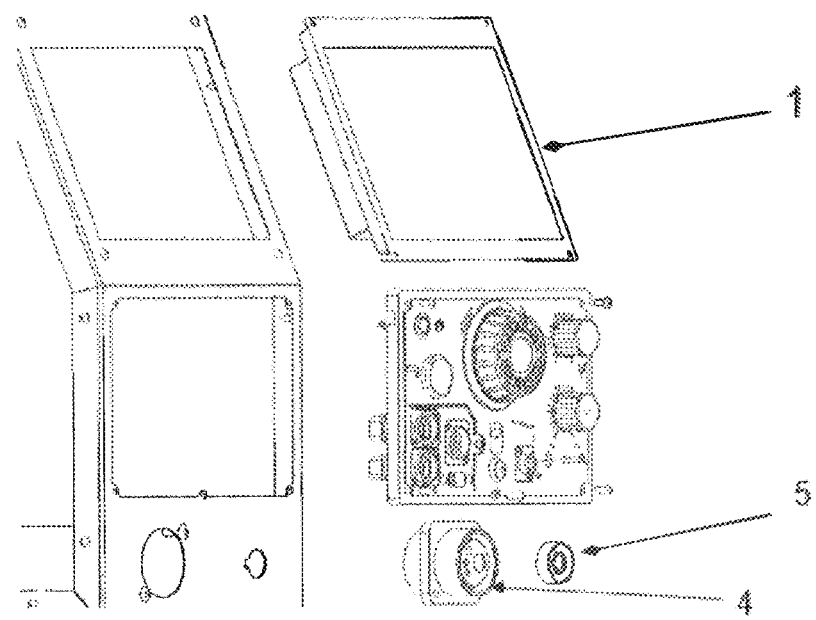

FIG. 4.—Front panel of the "Advanced device for the welding training based on simulation with Augmented Reality and with remote updates" CPU. As shown in FIG. 4, the welding training device includes an LCD monitor 1, a real connector for the MIG/MAG (GMAW) and TIG (GTAW) torches 4, and a real connector for an electrode clamp 5 configured to hold a simulated electrode (e.g., an electrode (SMAW) stick) and/or a simulated filler rod (e.g., a TIG (GTAW) filler rod).

Figure 5:
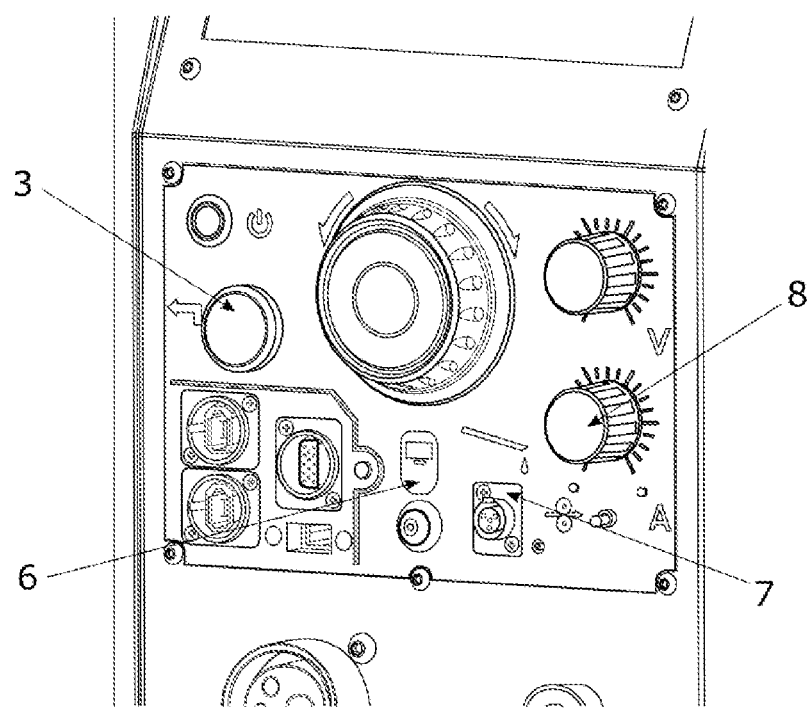

FIG. 5.—Control panel of the "Advanced device for the welding training based on simulation with Augmented Reality and with remote updates" CPU. As shown in FIG. 5, the welding training device includes an escape/return/cancel button 3, an "ON" and AR calibration button 6, a TIG (GTAW) electrode connector 7, and a position selector for wire speed and voltage 8.

Figure 6:
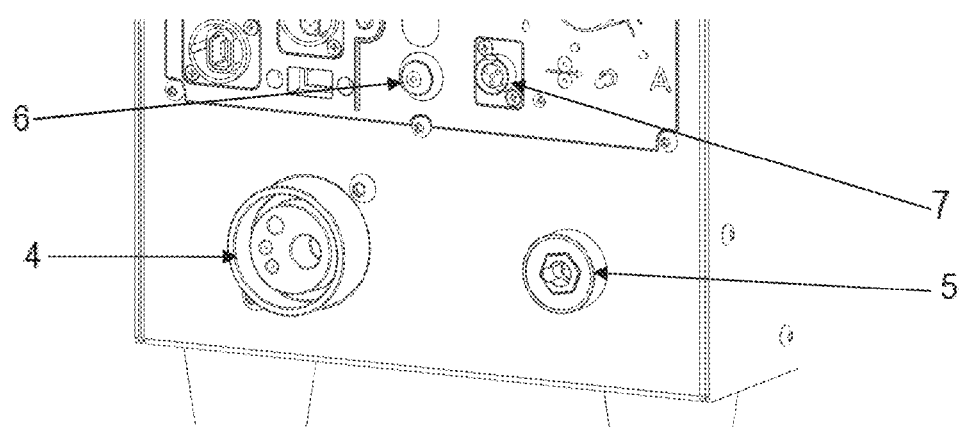

FIG. 6.—Real welding torches connector of the "Advanced device for the welding training based on simulation with Augmented Reality and with remote updates". As shown in FIG. 6, the welding training device includes a real connector for the MIG/MAG (GMAW) and TIG (GTAW) torches 4, a real connector for an electrode clamp 5, an "ON" and AR calibration button 6, and an electrode connector 7 for an electrode (e.g., an electrode (SMAW) stick) and/or a rod of supply material (e.g., a TIG (GTAW) filler rod).

Figure 7:
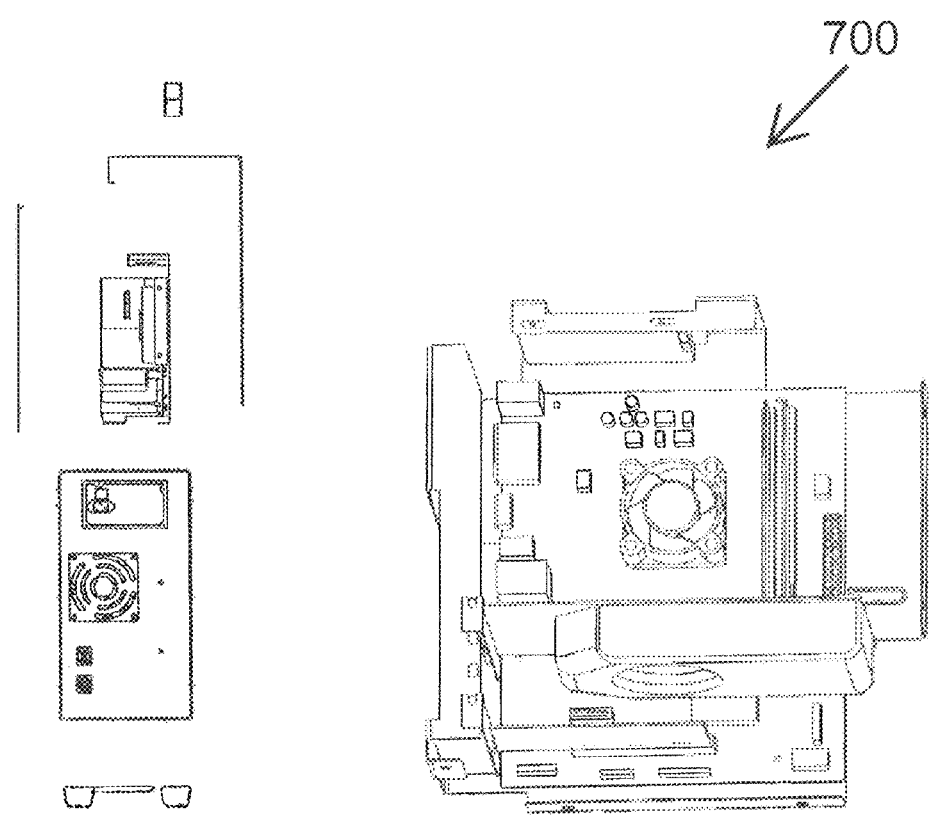

FIG. 7.—Internal frame 700 for the components distribution of the "Advanced device for the welding training based on simulation with Augmented Reality and with remote updates".

FIG. 8.—Multiple views 800 of a MIG (GMAW) torch tip of the "Advanced device for the welding training based on simulation with Augmented Reality and with remote updates".

FIG. 8.A—MIG (GMAW) torch tip 800A of the "Advanced device for the welding training based on simulation with Augmented Reality and with remote updates". Upper left perspective view.

FIG. 8.B—MIG (GMAW) torch tip 800B of the "Advanced device for the welding training based on simulation with Augmented Reality and with remote updates". Underside perspective view (C).

FIG. 8.C—MIG (GMAW) torch tip 800C of the "Advanced device for the welding training based on simulation with Augmented Reality and with remote updates". Upper right perspective view.

FIG. 8.D—MIG (GMAW) torch tip 800D of the "Advanced device for the welding training based on simulation with Augmented Reality and with remote updates" Right side perspective view (D).

FIG. 8.E—MIG (GMAW) torch tip 800E of the "Advanced device for the welding training based on simulation with Augmented Reality and with remote updates". Rear view.

FIG. 8.F—MIG (GMAW) torch tip 800F of the "Advanced device for the welding training based on simulation with Augmented Reality and with remote updates". Left side view (B).

FIG. 8.G—MIG (GMAW) torch tip 800G of the "Advanced device for the welding training based on simulation with Augmented Reality and with remote updates". Left underside view perspective.

FIG. 8.H—MIG (GMAW) torch tip 800H of the "Advanced device for the welding training based on simulation with Augmented Reality and with remote updates". Upper side view (A).

FIG. 8.I—MIG (GMAW) torch tip 800I of the "Advanced device for the welding training based on simulation with Augmented Reality and with remote updates". Right underside view perspective.

FIG. 9.—Multiple views 900 of a TIG (GTAW) torch tip of the "Advanced device for the welding training based on simulation with Augmented Reality and with remote updates".

FIG. 9.A—TIG (GTAW) torch tip 900A of the "Advanced device for the welding training based on simulation with Augmented Reality and with remote updates". Upper left perspective view.

FIG. 9.B—TIG (GTAW) torch tip 900B of the "Advanced device for the welding training based on simulation with Augmented Reality and with remote updates". Underside view (C).

FIG. 9.C—TIG (GTAW) torch tip 900C of the "Advanced device for the welding training based on simulation with Augmented Reality and with remote updates". Upper right perspective view.

FIG. 9.D—TIG (GTAW) torch tip 900D of the "Advanced device for the welding training based on simulation with Augmented Reality and with remote updates". Right side view (D).

FIG. 9.E—TIG (GTAW) torch tip 900E of the "Advanced device for the welding training based on simulation with Augmented Reality and with remote updates". Rear view.

FIG. 9.F—TIG (GTAW) torch tip 900F of the "Advanced device for the welding training based on simulation with Augmented Reality and with remote updates". Left side view (B).

FIG. 9.G—TIG (GTAW) torch tip 900G of the "Advanced device for the welding training based on simulation with Augmented Reality and with remote updates". Left underside perspective view.

FIG. 9.H—TIG (GTAW) torch tip 900H of the "Advanced device for the welding training based on simulation with Augmented Reality and with remote updates". Upper side view (A).

FIG. 9.I—TIG (GTAW) torch tip 900I of the "Advanced device for the welding training based on simulation with Augmented Reality and with remote updates". Lower right view.

Figure 10:
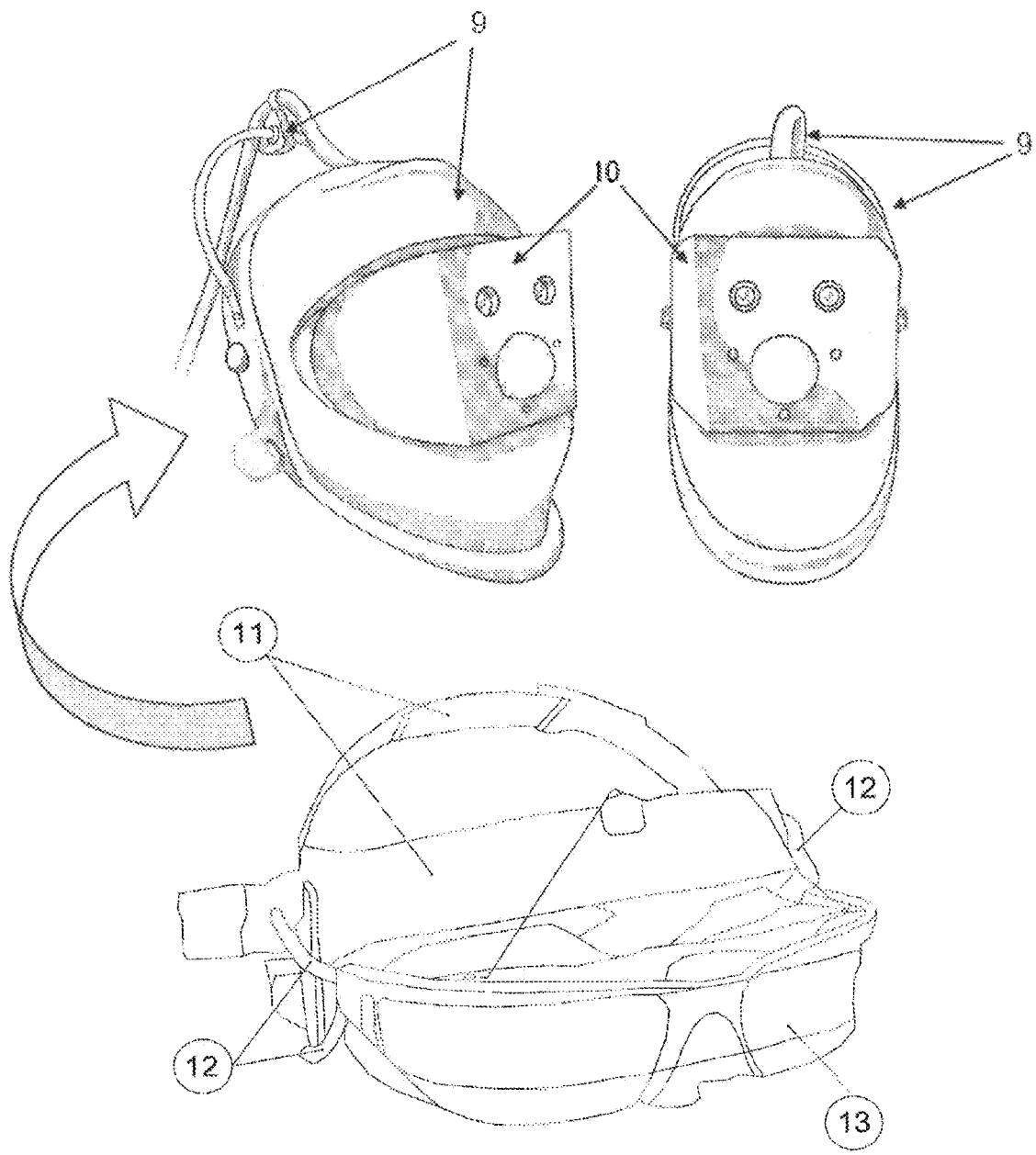

FIG. 10.—Augmented Reality welding mask 9 with a cable management system, two micro-cameras (stereo vision), head-mounted display 11, lighting system with LEDs and light diffuser, mini speakers and a single cable. As shown in FIG. 10, the welding mask 9 also includes a protective cover 10 anchored to the welding mask and configured to prevent falls, a pioneer anchoring system 12, and video glasses 13.

Figure 11:
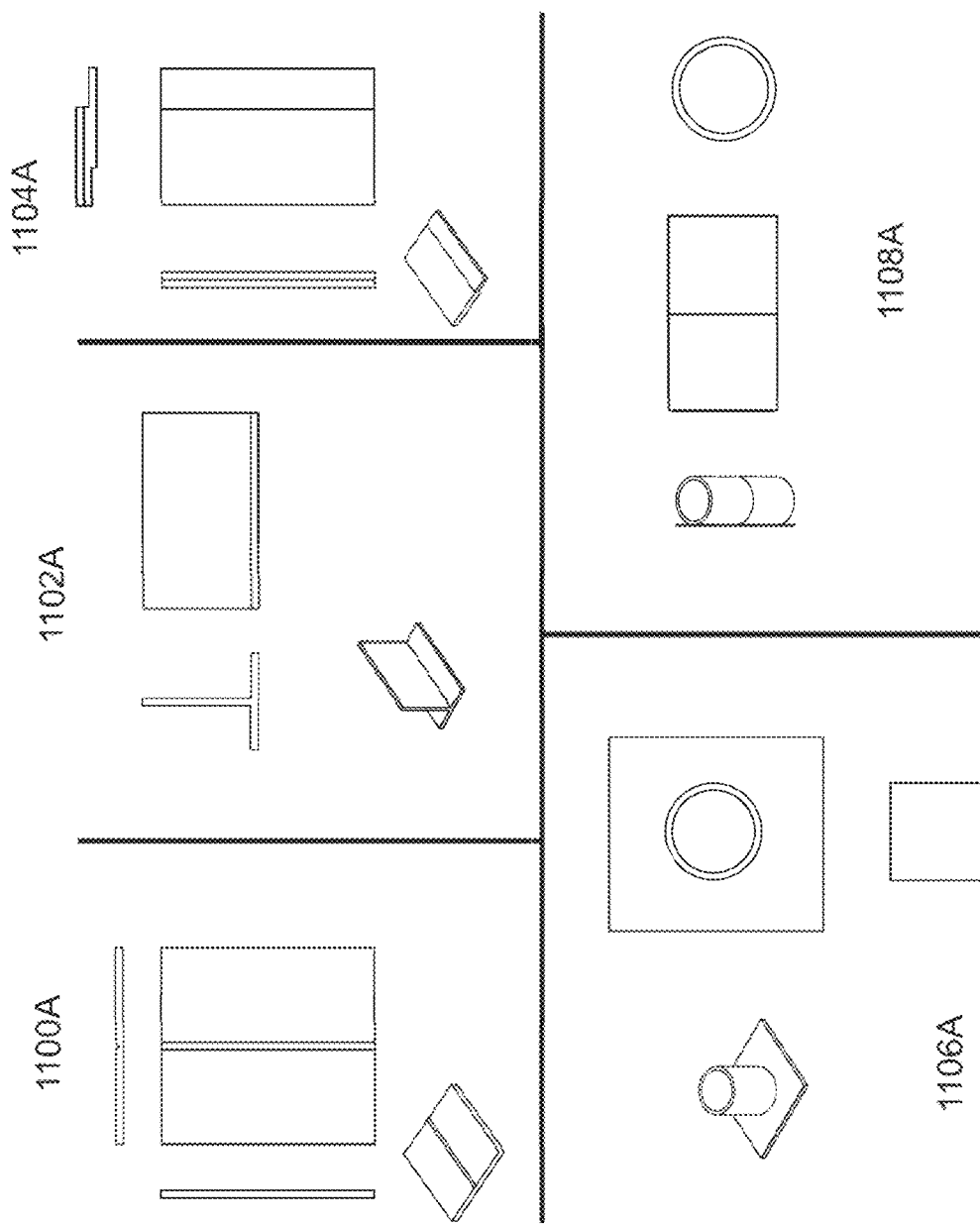
Figure 12:
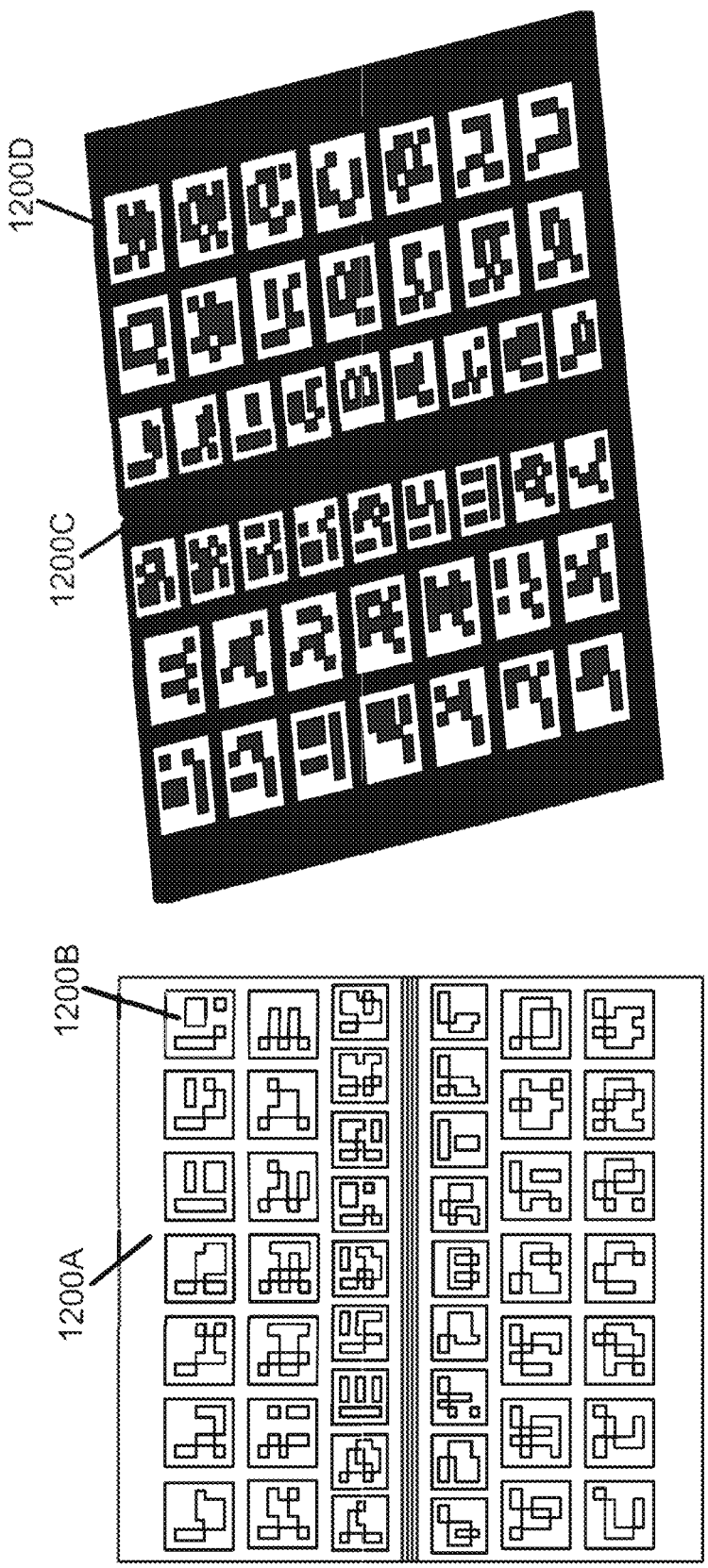

FIG. 11.—Work pieces that represent the different joint types: plate butt joints 1100A, plate T-joints 1102A, plate lap joints 1104A, pipe T-joint 1106A and pipe butt joints 1108A (fillet and V-Groove). All of them incorporate a design of the ARMarker layout:

Workpieces that represent the different types of joints to weld in:

FIG. 12.—Plate butt joint. As shown in FIG. 12, a plan view 1200A of a plate butt joint includes a marker 1200B, and perspective view 1200C of a plate butt joint includes a marker 1200D.

Figure 13:
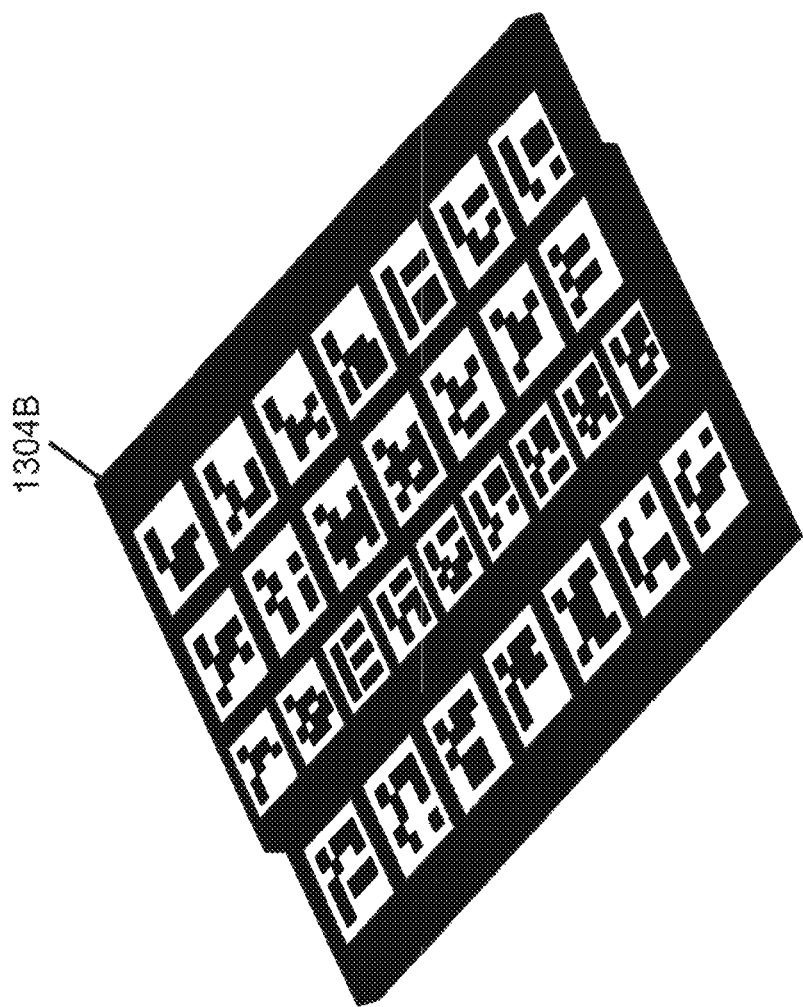
Figure 13:
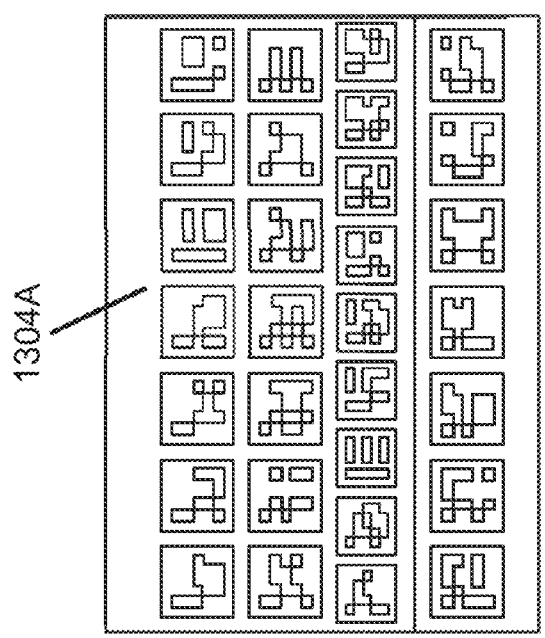

FIG. 13.—Plate lap joint, shown in plan view 1304A and perspective view 1304B.

Figure 14:
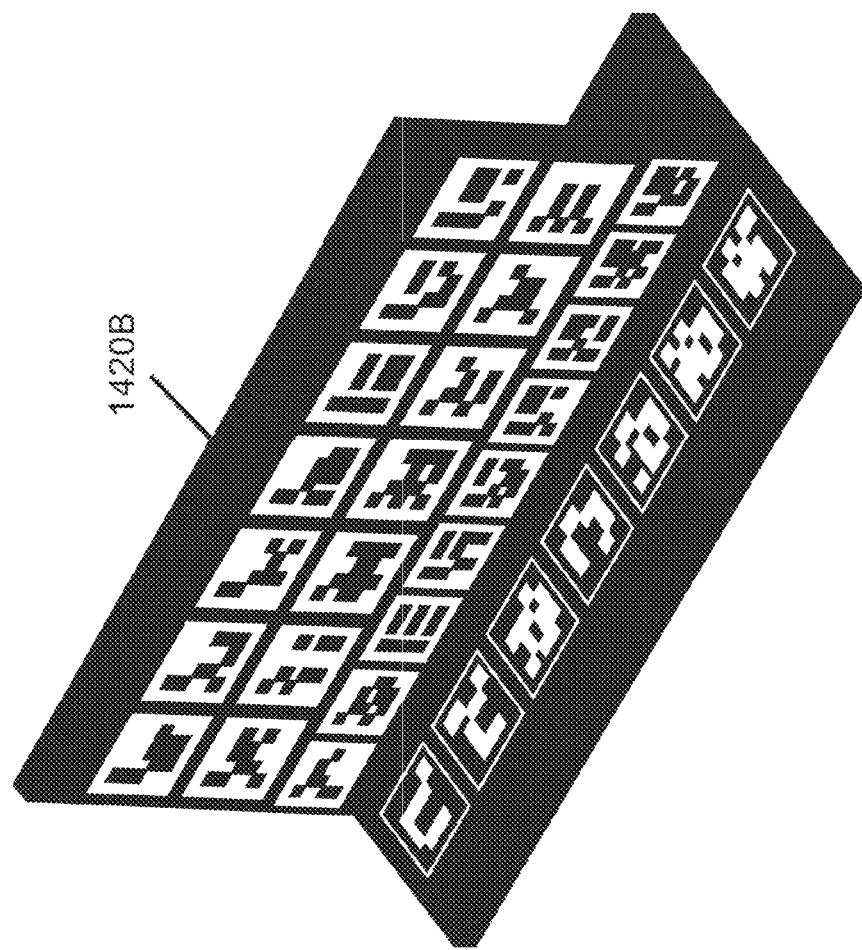
Figure 14:
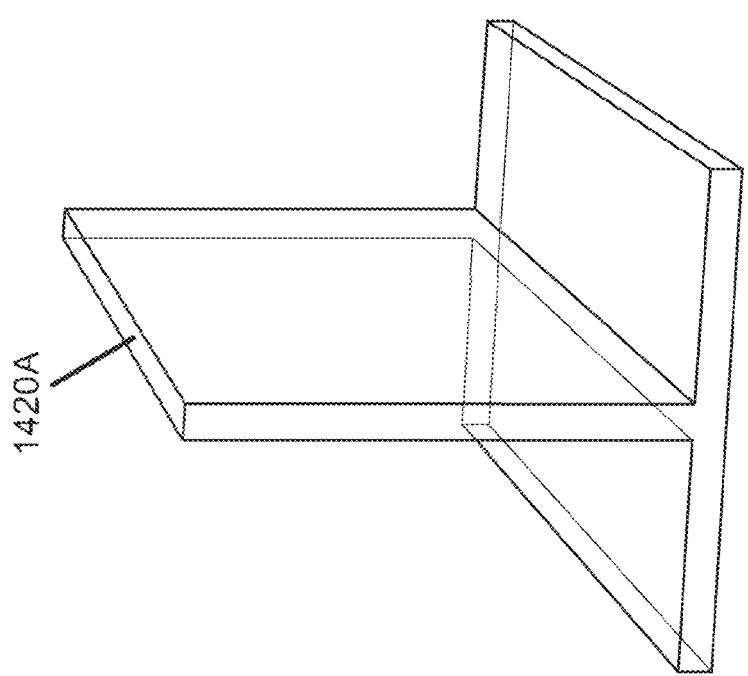

FIG. 14.—Plate T-joint, shown in a first perspective view 1402A and a second perspective view 1402B.

Figure 15:
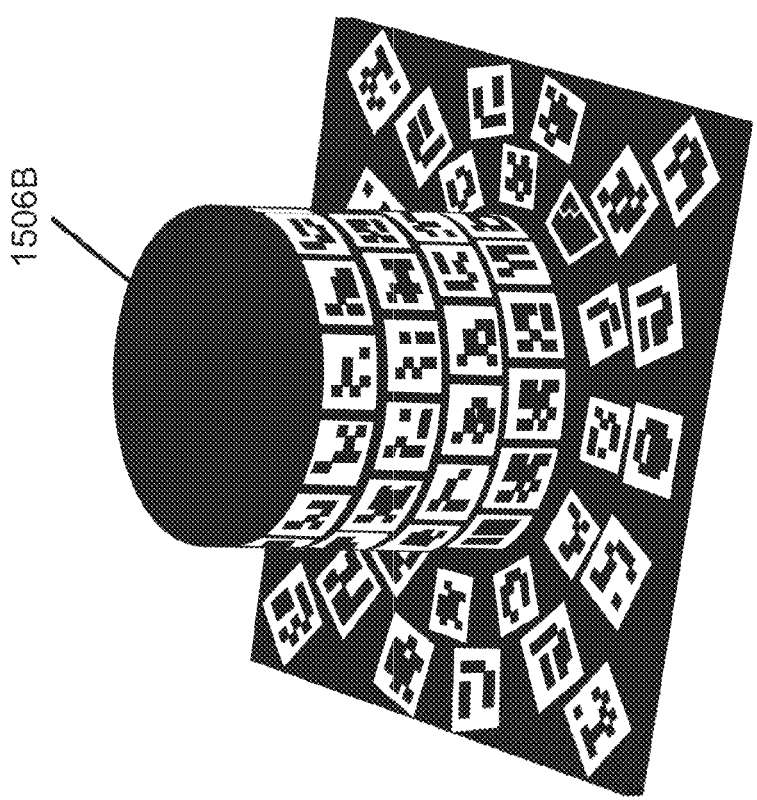
Figure 15:
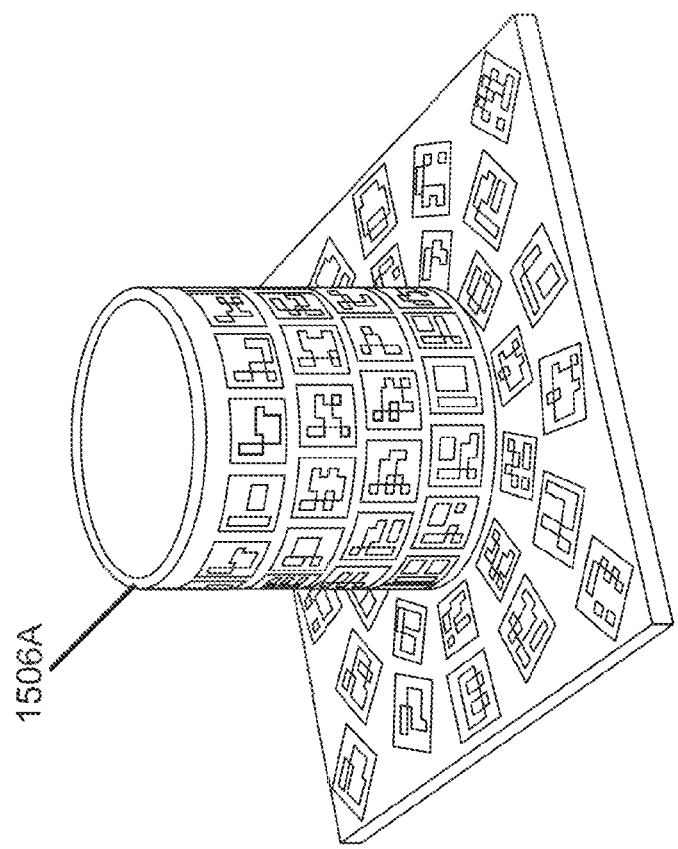

FIG. 15.—Pipe T-joint, shown in a first perspective view 1506A and a second perspective view 1506B.

Figure 16:
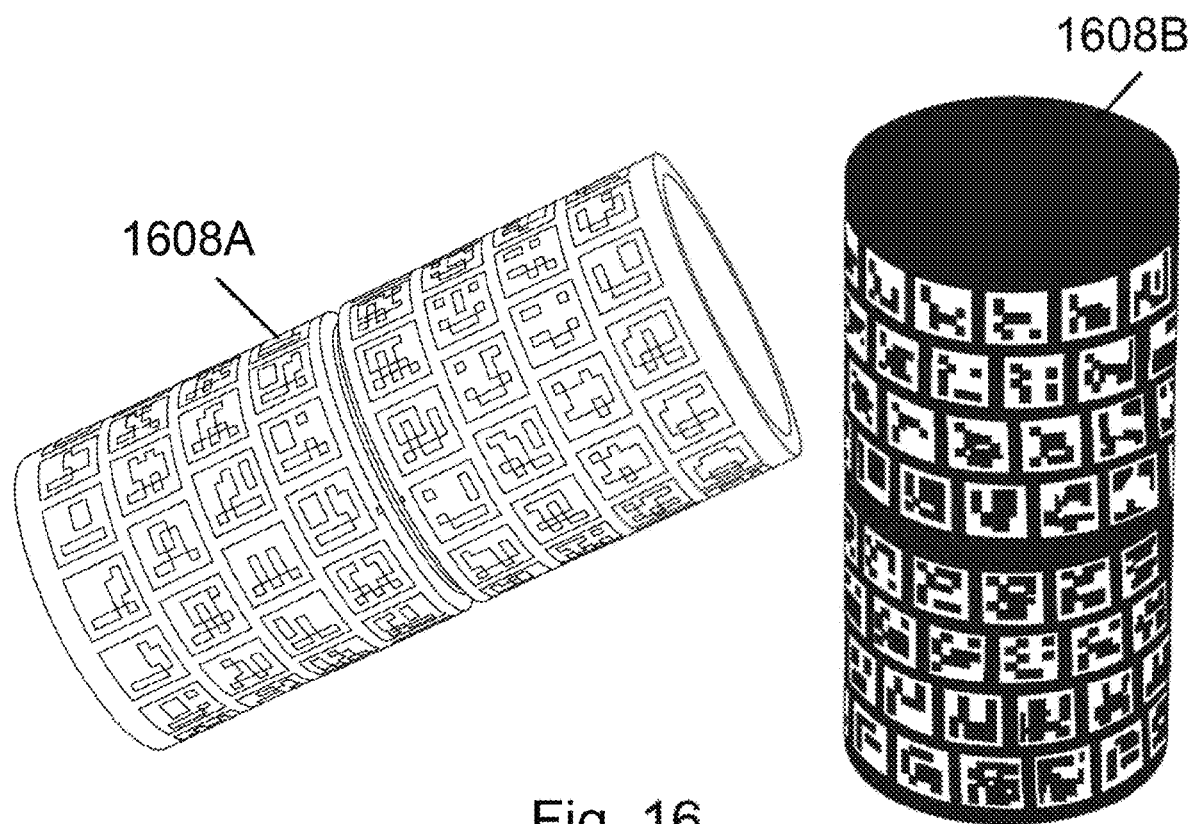

FIG. 16.—Pipe butt joint (V-Groove), shown in a first perspective view 1608A and a second perspective view 1608B.

Figure 17:
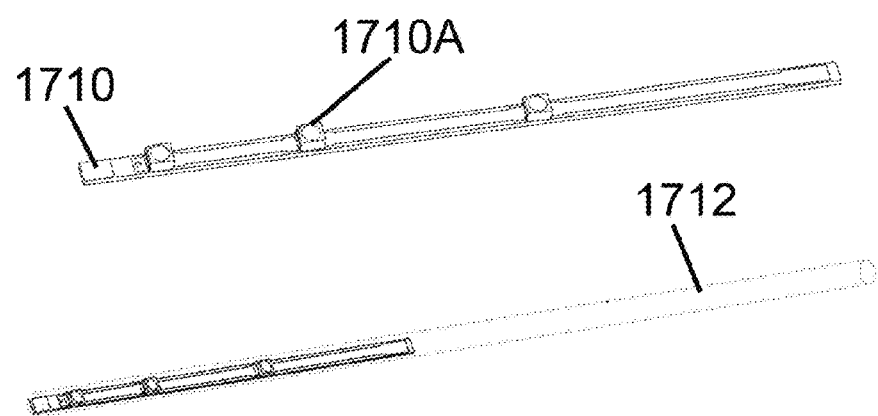

FIG. 17.—Electrode stick 1710, including an LED 1710A, and TIG (GTAW) filler rod 1712.

The different figures have the following enumerated elements:
1. LCD monitor for the visualization of the system menus.
2. Navigation central button.
3. Escape/return/cancel button.
4. Real connector for the MIG/MAG (GMAW) AND TIG (GTAW) torches.
5. Real connector for the electrode clamp.
6. ON Button and AR calibration button.
7. Conector para electrodo y varilla de aporte de material TIG (GTAW).
8. Position selector for the wire speed and the voltage.
9. Welding mask with a cable management system.
10. Protective cover which prevents falls and which is anchored to the welding mask.
11. Head-mounted displays.
12. Pioneer anchoring system.
13. Video glasses.

PREFERRED EMBODIMENT OF THE INVENTION

The "Advanced device for the welding training based on simulation with Augmented Reality and with remote updates" is a simulator that provides an environment that is analogous to a real workshop, so the user can execute the same actions and welding processes as in reality. It is composed for the following elements:
1. An operating system based on a Linux version (open code) that has been optimized for the specific requirements of the system, so it is able to support high definition 30 graphics and the communications between student-simulators, simulators-teacher and server and between the virtual classroom (set of student-simulators, teacher-simulator and server) and the center for remote technical assistance
2. Implementation of mathematical algorithms that can simulate in 3D a real welding process with all the variants that it includes: proceeding level (parameters regulation, determination of the position, selection of the material, work piece, gas and filler rod), execution (melting, smoke, splatters, welding bead cooling, affected area by the heat), results and possible welding defects (gravity, welding pores, penetration excess, lack of melting). In the same way, it can simulate the different welding processes: SMAW, TIG (GTAW) and MIG/MAG (GMAW,FCAW) and can detect the different mistakes that are made by the users during the welding execution. These algorithms also take into account the physical properties of the different materials to offer a final result in line with those properties, the selected welding parameters and the user's execution.
3. Specific Teacher Software that manages, in a comprehensive manner, the Virtual Classroom composed for the different student-simulators that area interconnected by each other and connected, in turn, to the teacher laptop/computer through a local network. The Teacher Software allows managing the classroom, students and exercises and monitoring the activity of the student-simulators in real time and remotely. Moreover, the Student-simulator, which is demanded in the present document, incorporates its own software that is composed for several integrated software libraries that plan the exact behavior of a real welding equipment and offer the same result as in reality in basis of: the selected welding parameters by the teacher/student (voltage, intensity, gas type), the material and joint type, the work piece type, the welding position and the selected welding process (SMAW, MIG/MAG (GMAW, FCAW) or TIG (GTAW).
4. Development of the Augmented Reality application, so the user can simulate the welding process on a real work piece, instead of simulating a welding process through a screen or a virtual environment.

Using the Augmented Reality techniques, the virtual images, generated by a computer, are overlapped in real environments, combining both elements to create a mixed reality in real time that provides the students with extra information about the environment in question. In this way, the user cannot be disoriented to time.

The main difference between the Augmented Reality and the Virtual Reality is that the former complements and enriches the real world instead of replacing it as the latter does. The Virtual Reality offers a computer environment that is artificial and fictitious, while the Augmented Reality keeps the user in contact with reality joining it with virtual objects to improve its perception.

It would be possible to visualize three virtual image layers with the present invention superimposed on different real objects that interact by each other when the user wants to. Depending on the interaction and on the selected parameters, the virtual images are going to generate a specific behavior and a specific final result of the execution.

This capacity is pioneer and produces a simulation experience that is incredibly real and where the user can visualize a physical work piece on which a virtual image is represented, for instance: a real work piece with a virtual carbon steel texture. Moreover, the user can visualize other welding supplies as welding torches, electrode sticks, filler rods and, even, his own hands. The system superimposes virtual images on those supplies, so the student is able to see the different levels of superimpositions and depths, as happens in reality.

When the virtual image appears, it covers almost the whole (or just a part) of the real one, where the elements can be set beneath the virtual image or over it. To carry out that action, the advanced system of Augmented Reality, which is incorporated in the present invention, crops those elements that will be hidden under the virtual image. However, the system 'paints' again those virtual images to let the user visualize them in a coherent way.

As an example of the previous idea, we can 'paint' on a plastic work piece (real object with its ARmarkers) a metallic work piece (virtual image). If the user puts his hand between his eyes (in this invention between the welding mask), the virtual image will hide it. Nevertheless, that does not happen in this invention because it generates a coherent image to let the user have the same sensations as in reality.

For that reason, the Augmented Reality system searches for determined patterns as the ARmarkers of the work pieces or the welding torches, or the LEDs of the electrode sticks and filler rods. Once those patterns are detected, the system places them oriented in the space and in a tridimensional position. The proposed simulation device based all its Augmented Reality processing on the artificial vision library OpenCV, which is a set of functions that are related with the image processing.

The artificial vision system of the present invention is composed for three parts: capture of images, elements detection and graphic representation.

Regarding the software, the elements detection and the graphic representation is divided in the following libraries:
a. CV Image: library that manages the use of the cameras. This library is able to detect all the connected cameras and to capture all their images. The captured images are changed to a format that is supported by OpenCV.
b. CV Stereo: internal library to detect the different elements of the Augmented Reality.
c. Specific: development library itself for the detection of the different elements of the Augmented Reality.
d. Vlib: this library interprets the previous one and generates all the welding graphics.

For the visualization of the processes generated by the Augmented Reality, some Head-Mounted Displays (HMDs) or video glasses are used. In this system, the outside world is captured by one or more cameras that show the user the mixed reality (real and virtual images) through the video glasses.

In the preferred embodiment of the invention, commercial head-mounted displays or video glasses are used like Vuzix, eMagin, or Kopin. The same happens with the micro cameras (stereo vision) as the also use commercial branches for a better delivery of quality service: Point Grey, The Imagine Source or IDS. Those cameras are place-leveled at eye-level in a commercial welding mask. Nevertheless, the system is developed to be compatible with most of the commercial cameras and video glasses avoiding any dependence on just one supplier or manufacturer.

It would be also possible to use a house-design welding mask by incorporating the necessary connectors to connect it to the central unit of the invention and adding one or two micro displays and two eye lenses.

The real environment is captured in stereo by the two micro-cameras that are placed in the welding mask, and that information is processed by the system that generates the virtual graphics superimposed on the environment to create the mixed reality offered to the user through the video glasses or through the head-mounted displays.

All this is possible thanks to the software that makes the use of the device easy and intuitive.

The design is based on the plug&play philosophy, so if there is something not necessary to achieve the best welding training experience, it will be rejected.

The implemented software can be described as simulation software of real welding exercises focused on the training and entertainment of welders (all levels). It is controlled by a Teacher Software through a network connection and Class Control application that allows the teacher assigning the different exercises or theoretical content to every single student, monitoring the state and execution of all those exercises and recovering all the contents to assess them.

The Teacher Software monitors everything related to a conventional class in real time. The teacher can: create curses, add a student or remove it, create exercises and add its own theoretical contents. He is also able to store all the exercises done by the students thanks to the Analysis Module, which allows him visualizing graphics that show the students' progress, their mistakes and their skills based on the different technical parameters (speed, arch distance, work angle, travel angle), and on the different welding defects (porosity, splatters, etc.).

Besides, this invention has been developed to be used in a standard training classroom: a standard classroom is composed for desks and table for the teacher and, in the case of the classroom in which this invention is implanted; there would be as much simulators as students and laptop with the Teacher Software (all interconnected by a cable or Wi-Fi). Moreover, apart from the classroom configuration, it is also possible to use a simulator as a didactic material: the teacher can use it as a support when giving the theoretical contents to show the students what is he talking about and this possible because the simulator incorporates a RGB video output, so it can be connected to an external projector.

Finally, the system can be connected to Internet to provide the users with a better remote support in real time. The Internet connection fulfills a two-fold function: the first one is the possibility of downloading all the system updates and the second one is the remote assistance, so the supplying company can be easily connected to any simulator worldwide to repair it remotely (under the user's authorization).

In view of the above information, the present invention, at a Software level, uses an application where several configurations are possible and it consists on some programs that are stored in different equipment all of them connected through two Ethernet networks. The first network is a local one, that is, the network of the user's facilities or classroom composed for student-simulators, a local server and the teacher's laptop. The second network connects the first one to the Internet server.

Furthermore, the main network of the present invention is composed according to the user's local network, which has several student-simulators, a central server and teacher's laptop, all of them with the following specifications:
e. Student-simulator: is the central core of the present invention with which all the exercises can be executed through simulation and it also allows the visualization of the theory contents in its screen. It loads its configuration from the central server and stores all the executed exercises.
f. Central server: it stores all the configurations designed by teacher for every single student and all the executed exercises.
g. Laptop with the Teacher Software: it configures the central server managing all the information that is related with the students, courses, exercises and theory. It also recovers all the exercise executions to asses them.

All the student-simulators connected to each others (classroom configuration) compose the invention network. A single simulator with a laptop with the Teacher Software conform the StandAlone configuration in which the server role is played by the simulator itself.

The second Ethernet network, previously described, connects the central server of the user's device to the supplier's servers. This connection is made through Internet. The supplier's servers have all the necessary updates for each simulator and the remote assistance.

The updates management is carried out by the following procedure: the user's central server is connected, via Internet, to the supplier's servers and makes a copy of all the updates. When the simulator is switched on, it "asks" its central server for new update and if there is any available update in that moment, it requests permission to update the system. If that request is accepted, the device will be updated automatically.

The remote assistance is equally managed from the supplier's servers through its connection via Internet to the central servers of the different classrooms. If any simulator has a problem, the support team of the supplying company can access remotely to the simulator in question to solve the problem storing all the configuration and all the exercise executions.

Both the student-simulator and the central server have been designed (at a Software level) from the Operative System to the final application of each simulator. The Operative System was a crucial element when designing the software because it is necessary to design a highly configurable system with the capacity of limiting its own functionality to have fewer mistakes. For that reason, the system is completely based on Linux Ubuntu 10.1: the operative system have been designed with the basic Linux commands, that is, the Xorg server to start graphic applications, the NFS server to share fields, the Drivers and the necessary commands to start the equipment in a console mode.

As it has been said before, the Augmented Reality is a very complex technology composed for hardware and software elements. Regarding the hardware, the simulator of the present invention can use two micro-cameras, which form a system of stereo vision that is used to detect different elements in the space. This stereo system functions as our eyes detecting the peripherals of the present invention (work pieces, welding torches, electrodes and filler rods) and the working environment in question.

In order to achieve the maximum effectiveness of the system, it has been a priority in its design to find the way of a quick search for the different elements that are involved in a real welding process: welding work pieces, welding torches, filler rods and electrode sticks. To facilitate their special localization, they incorporate ARMarkers. Depending on the objects geometry, there are two types of ARmarkers:

a. Markers: they are barcodes in two dimensions. It is too easy to find them and they are able to store numeric data that is used to distinguish the different elements. In other words, depending on the numeric date, the system will know if the user is using a work piece or another element. They have a square shape and each of them is different from the rest.

b. LEDs (Light-Emitting Diode): the electrode sticks and the filler rods have a very particular shape, so the ARmarkers cannot be added. For that reason, to obtain a complete training experience, other types of markers have been created to be incorporate them in the electrodes and the filler rods (4 mm of thickness) without changing their appearance: a set of aligned and not equidistant LEDs, so the system can detect the movement and direction of the above mentioned elements.

As a mode of conclusion, the 'Advanced device for the welding simulation in the training processes" uses system of stereo vision composed for two micro-cameras fed by USB cables or Firewire and some glasses with HDMI or VGA video output (digital or analogic) to show both the reality and the additional information generated by a computer. Moreover, it uses a set of work pieces with ARmarkers, three types of welding torches with ARmarkers and filler rods and electrodes sticks with LEDs markers.

With all the above characteristics a particular environment is obtained: an environment with conditions, sensations and welding results that are very similar to the real welding and it facilitates the students' learning and training.

It is not considered necessary to expand this description because there is enough information for an expert to understand the scope of the invention and its advantages. Its technology, design, the elements dimension and the materials will be subject to changes as long as they do not alter the essence of the invention.

The invention claimed is:

1. A system for welding training based on an augmented reality simulation, comprising:
    a student simulator configured to execute one or more augmented reality training exercises through simulation and to visualize theory contents on a screen;
    a teacher computer, configured to monitor, in real time and remotely, a virtual classroom comprising a student and a teacher, by managing student information; and wherein the teacher computer comprises:
    a class control application that allows the teacher assigning exercises to the student, monitoring the execution of said exercises and recovering the student information to assess said students; and
    an analysis module configured to assess the exercises executed by the student and to show graphics of the student progress based on a plurality of technical parameters and welding defects;
    and wherein the student simulator further stores a configuration designed by the teacher for the students and the one or more exercises executed by the students,
    a welding mask, connected to the student simulator, including a set of confocal cameras operably coupled to video glasses, the video glasses configured to display, to the student during use, a three-dimensional mixed-reality setting including real images captured by the set of confocal cameras and at least one virtual element; and
    a workpiece including a marker disposed on a surface thereof, the marker having a predetermined pattern,
    wherein the set of confocal cameras is configured to search for the predetermined pattern and, after identifying the predetermined pattern, the welding mask is configured to permit interaction between the workpiece and the at least one virtual element within the mixed-reality setting, and
    wherein the predetermined pattern is distinguishable from the workpiece by the set of confocal cameras due to a color difference.

2. The system of claim 1, further comprising a central server configured to store a configuration designed by the teacher for the student, and to store the one or more exercises executed by each student; being said central server configured by the teacher computer.

3. The system of claim 2, further comprising a plurality of interconnected student simulators configured to run the augmented reality welding simulation by loading the configuration received from the central server, and wherein the student simulators are connected to the teacher computer.

4. The system of claim 1, wherein the technical parameters selected by the teacher or the student comprise at least one of the following: voltage, intensity, gas type, material and weld joint type, workpiece type, welding position over the workpiece, welding procedure, welding speed, arch distance, work angle, travel angle, welding defects in the workpiece; and wherein the welding parameters comprise at least one of the following: porosity, splatters, gravity, welding pores, penetration excess, lack of melting.

5. The system of claim 3, in which the updates management is carried out by performing the following steps:

the central server is connected, via Internet, to a supplier server which in turn comprises a copy of all the updates available for the system;
when the student simulators are switched on, said simulator asks to the central server for a new update, if any;
if there is an available update, the student simulator request permission to be updated; and
if permission is acknowledged, the system updates automatically.

6. The system of claim 5, wherein the central server is connected to the supplier server which provides remote technical assistance to the student simulator.

7. The system of claim 1, wherein the student simulator comprises integrated software libraries which mimic the behavior of a real welding equipment during the augmented reality welding simulation based on the technical parameters.

8. The system of claim 1, wherein the predetermined pattern includes a two-dimensional barcode.

9. The system of claim 1, wherein the predetermined pattern includes a plurality of light-emitting diodes (LEDs).

10. The system of claim 1, wherein the welding mask is configured to simulate at least one of: shielded metal arc welding (SMAW), metal inert gas (MIG) welding, metal active gas (MAG) welding, gas metal arc welding (GMAW), flux-cored arc welding (FCAW), tungsten inert gas (TIG) welding or gas tungsten arc welding (GTAW).

11. The system of claim 1, wherein the predetermined pattern of the workpiece is a first predetermined pattern, the system further comprising a welding torch including a marker disposed on a surface thereof, the marker of the welding torch having a second predetermined pattern, and
in response to the first predetermined pattern and the second predetermined pattern being identified by the set of confocal cameras, the welding mask is configured to permit interaction between the workpiece, the welding torch, and the at least one virtual element within the mixed-reality setting.

12. The system of claim 1, further comprising a welding torch having a modified tip, the welding mask configured to permit interaction between the workpiece and the modified tip within the mixed-reality setting.

13. The system of claim 1, wherein the augmented reality welding mask includes a memory and a processor operatively coupled to the memory, and a control system configured to monitor actions of the student during use; being the processor configured to:
generate a plurality of virtual elements for presentation to a student; and
generate a representation of an interaction between at least one virtual element from the plurality of virtual elements and a non-virtual object in response to detection, by a camera operably coupled to the processor, of a marker disposed on the non-virtual object, the detection based at least in part on a color difference associated with the marker.

14. The system of claim 13, wherein the non-virtual object is a first non-virtual object, the processor further configured to generate a virtual representation of an interaction between the first non-virtual object and a second non-virtual object.

15. The system of claim 14, wherein the non-virtual object is a first non-virtual object and the marker is a first marker, the processor further configured to generate a representation of an interaction between the at least one virtual element from the plurality of virtual elements, the first non-virtual object, and a second non-virtual object in response to detection, by the camera, of the first marker and a second marker disposed on the second non-virtual object.

16. The system of claim 1, wherein the set of confocal cameras are configured to recognize:
a first marker having a first predetermined pattern associated with a welding torch; and
a second marker having a second predetermined pattern associated with a workpiece, said second predetermined pattern being distinguishable from the workpiece by the set of confocal cameras due to a color difference, and
the welding mask is configured to permit interaction between the welding torch, the workpiece and the at least one virtual element within the three-dimensional mixed-reality setting in response to the first predetermined pattern and the second predetermined pattern being recognized.

17. The system of claim 1, further comprising an electrode clamp holding a simulated electrode and a simulated TIG (GTAW) filler rod, the simulated electrode and the simulated TIG (GTAW) filler rod comprising a microelectronic board and a plurality of optical fiber cords configured to obtain, at least, three light points in the surface of the simulated electrodes and filler rods.

18. The system of claim 1, wherein the electrode and the filler rod comprise a set of aligned and not equidistant Light-Emitting Diodes.

* * * * *